No. 710,883. Patented Oct. 7, 1902.
A. C. PALMER.
COMBINED HARROW AND SEED PLANTER.
(Application filed May 17, 1902.)
(No Model.) 3 Sheets—Sheet 1.

WITNESSES:

INVENTOR
Alden C. Palmer
BY
ATTORNEYS.

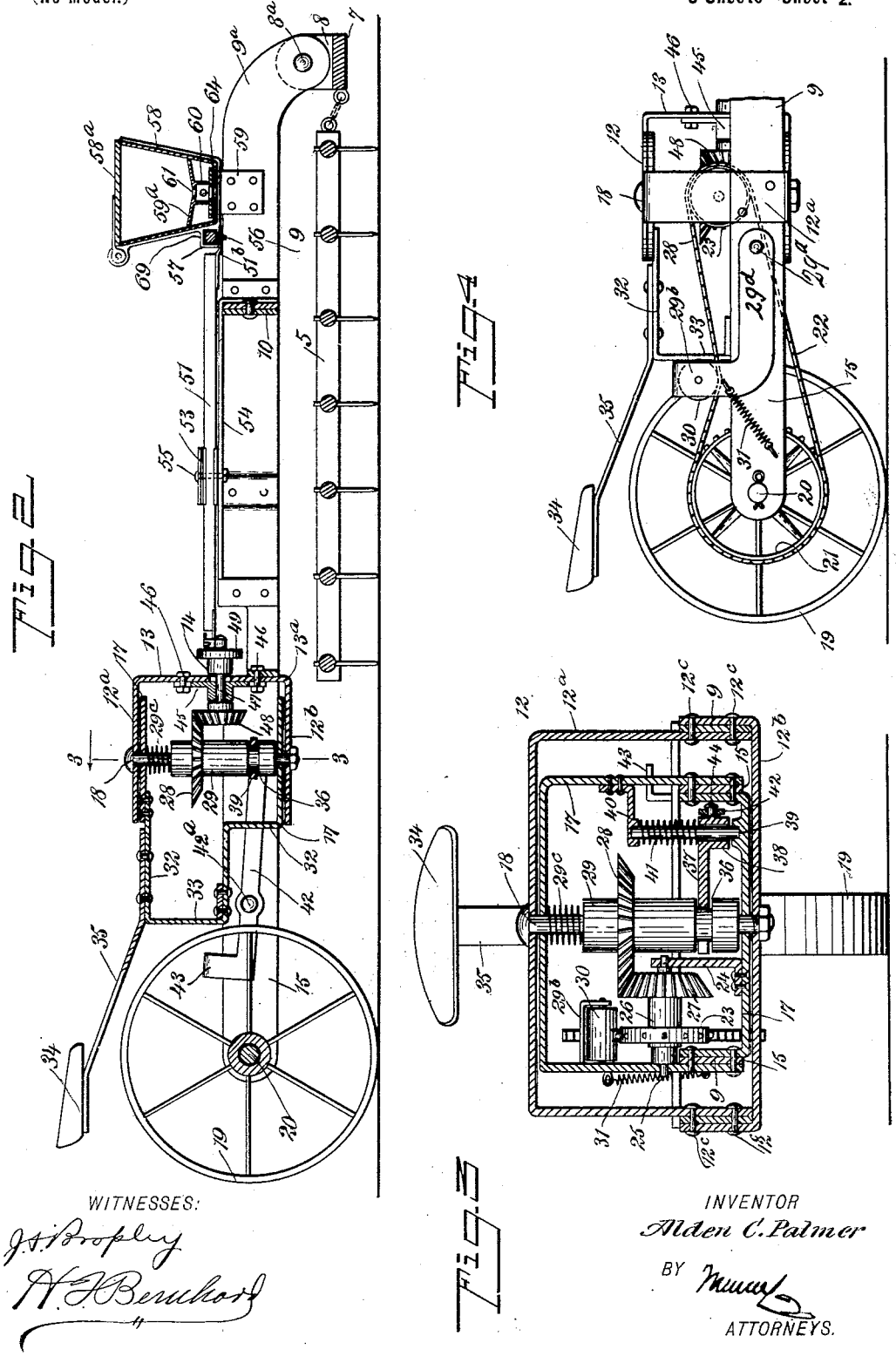

No. 710,883.  
Patented Oct. 7, 1902.

A. C. PALMER.
COMBINED HARROW AND SEED PLANTER.
(Application filed May 17, 1902.)

(No Model.)

3 Sheets—Sheet 3.

WITNESSES:

INVENTOR
Alden C. Palmer
BY
ATTORNEYS

THE NORRIS PETERS CO., PHOTO-LITHO., WASHINGTON, D. C.

UNITED STATES PATENT OFFICE.

ALDEN CALEB PALMER, OF WEST UNION, IOWA.

COMBINED HARROW AND SEED-PLANTER.

SPECIFICATION forming part of Letters Patent No. 710,883, dated October 7, 1902.

Application filed May 17, 1902. Serial No. 107,788. (No model.)

*To all whom it may concern:*

Be it known that I, ALDEN CALEB PALMER, a citizen of the United States, residing at West Union, in the county of Fayette and State of Iowa, have invented a new and useful Combined Harrow and Seed-Planter, of which the following is a full, clear, and exact description.

My invention relates to improvements in combined harrows and seeders; and the objects that I have in view are, first, the provision of means by which seed-planting mechanisms may be combined with harrow devices or the latter may be used separately, thus saving a farmer the expense of buying two machines and enabling certain kinds of seed to be planted in the soil to the best advantage; secondly, to so arrange the several mechanisms that the machine may be turned in a narrow space at the end of a row; thirdly, to provide an efficient dropping mechanism; fourthly, to provide means for throwing the dropping mechanism out of service, and, finally, to improve the machine in minor details with a view to securing simplicity and strength of construction and efficiency of operation with moderate cost in manufacture.

With these ends in view the invention consists in the novel combination of devices and in the construction and arrangement of parts, which will be hereinafter fully described and claimed.

Reference is to be had to the accompanying drawings, forming a part of this specification, in which similar characters of reference indicate corresponding parts in all the figures.

Figure 1:
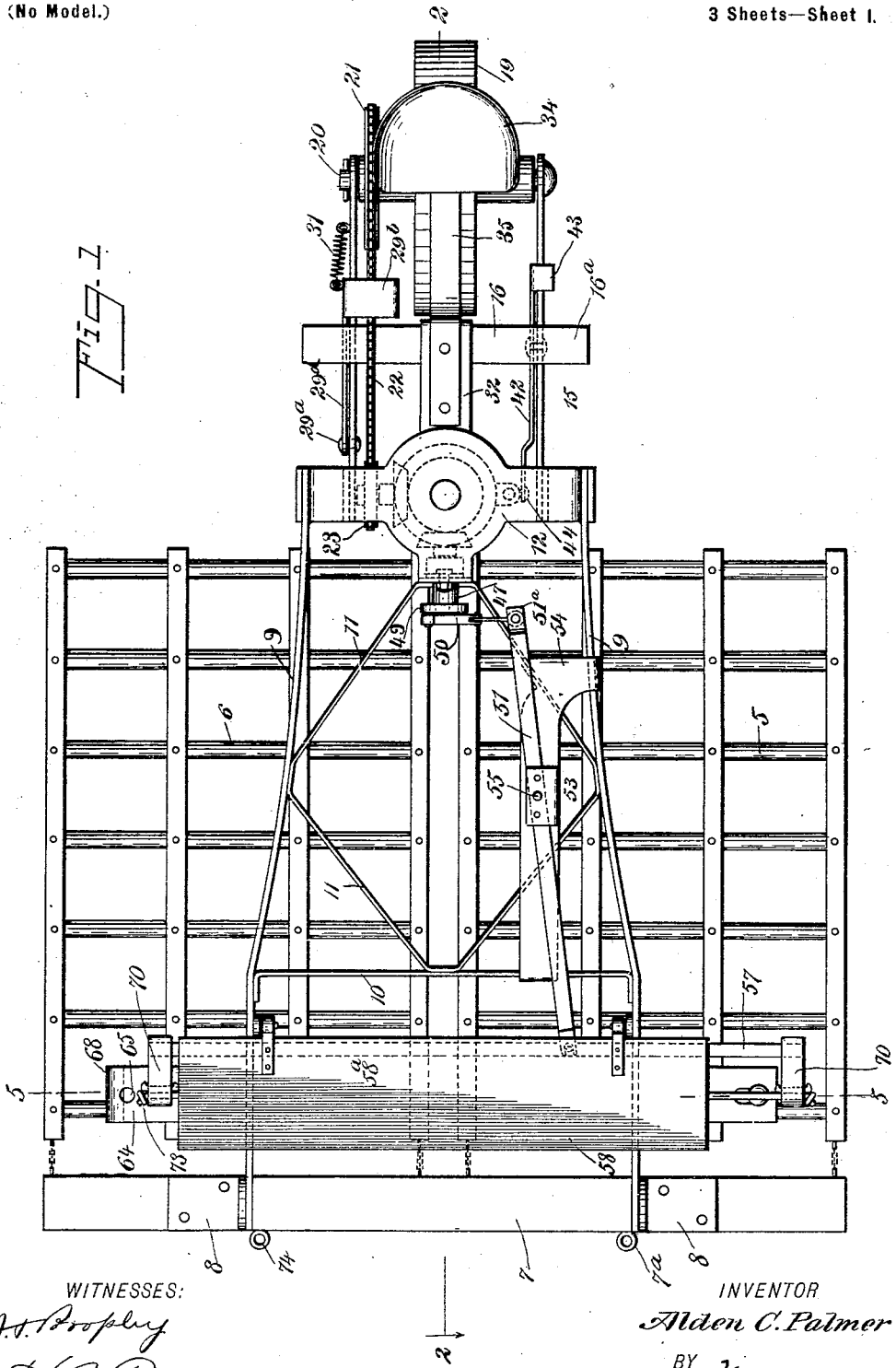
Figure 5:
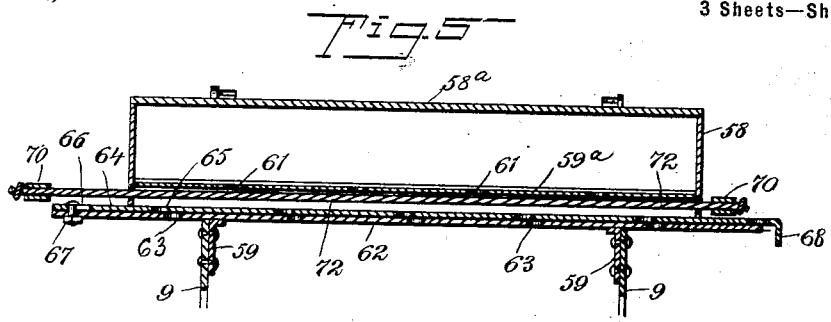
Figure 6:
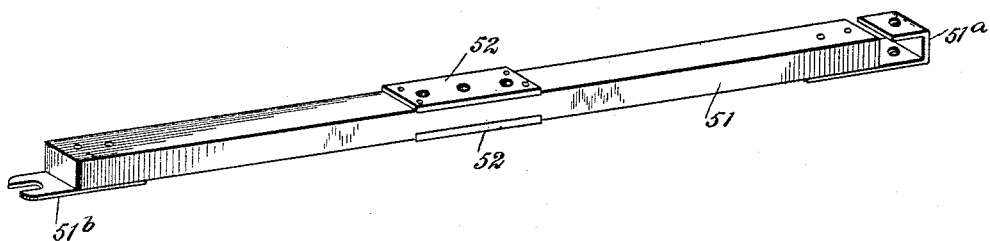
Figure 7:
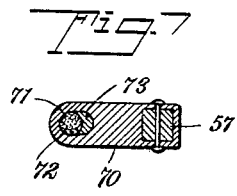
Figure 8:
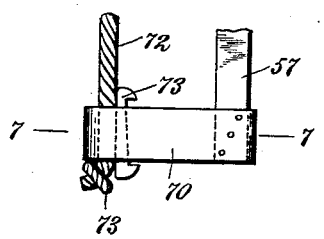

Figure 1 is a plan view of a combined harrow and seed-planter embodying the improvements contemplated by the present invention. Fig. 2 is a vertical longitudinal sectional elevation taken in the plane indicated by the dotted line 2 2 of Fig. 1 looking in the direction of the arrow. Fig. 3 is an enlarged vertical transverse sectional elevation taken through the plane of the dotted line 3 3 of Fig. 2 looking in the direction of the arrow. Fig. 4 is a view in side elevation of the rear portion of the seed-planting mechanism, illustrating the driving devices for the seed-dropping mechanism. Fig. 5 is a vertical sectional elevation taken longitudinally through the seedbox and the seed-dropping devices, the plane of the section being indicated by the dotted line 5 5 of Fig. 1. Fig. 6 is a detail perspective view of the connecting-lever between the crank-disk and a reciprocatory bar of the seed-dropping devices. Fig. 7 is a detail sectional view on the line 7 7 of Fig. 8, illustrating the means for attaching the reciprocatory bar to an agitator rope or cable of the said dropping mechanism; and Fig. 8 is a detail plan view of the parts shown by Fig. 7.

The harrow may be of any suitable or preferred construction, and it may consist of any desired number of sections; but in the embodiment of the invention shown by Figs. 1 and 2 of the drawings this harrow consists of two sections 5 6 and a suitable draft-bar 7, the latter being connected to the harrow-sections in any preferred way and equipped with draft-eyes $7^a$ or other preferred draft appliances. I do not consider it necessary to describe in detail the construction of the harrow, because no novelty therefor is claimed in this application.

I have provided a novel construction of the seed-planting mechanism, which embraces as one part thereof a peculiar style of frame adapted for the support of the seed-hopper and intended to be detachably secured to a part of the harrow mechanism. The harrow is arranged under the front part of the hopper-supporting frame, and said harrow and the frame are connected detachably together by upstanding brackets 8, that are bolted to the draft-bar 7. The hopper-supporting frame consists of the side bars 9, a cross-bar 10, a diamond-shaped brace 11, and a vertically-disposed yoke 12. The side bars 9 of the hopper-supporting frame are curved downwardly at their front ends, so as to form the short arms $9^a$, which are adapted to have overlapping relation to the brackets 8 and are fastened removably thereto by means of the bolts $8^a$. (See Fig. 2.) The cross-bar 10 is arranged to span the space between the side bars 9 of this frame at a line in rear of the seed box or hopper, and the end portions of this cross-bar are suitably fastened to the side bars. The yoke 12 is disposed in a vertical position at the rear part of the hopper-supporting frame, and this yoke consists of the members $12^a$ $12^b$, which are disposed in overlapping relation to each other and to the rear ends of the side bars 9, as shown more clearly by Figs. 1, 2, and 3, said parts being united together in any suitable way—as, for example, by the bolts or rivets 12$^c$. This vertically-disposed yoke 12 at the rear end of the hopper-supporting frame is provided with a vertical front member 13, which is preferably made an integral part of the member 12$^a$ of the yoke and is united to an upstanding member 13$^a$ on the lower member 12$^b$ of said yoke, as shown by Fig. 2, and this yoke member 13 is provided with a slot 14, adapted for the passage of a crank-shaft 47, which drives the seed-dropping mechanism, as will be hereinafter described. Said hopper-supporting frame is adapted to extend rearwardly beyond the harrow, and said rear end of the frame is supported by a wheeled trailer-frame, the latter being equipped with a ground-wheel, which serves to drive the mechanism by which the seed-dropping devices are actuated. This trailer-frame consists of the side bars 15, the cross-bar 16, and the yoke 17. The cross-bar 16 is fastened in a suitable way to the side bars 15 of the trailer-frame, and the end portions of this cross-bar are extended beyond said side bars 15 in order to form the foot-rests, (indicated at 16$^a$.) The yoke 17, forming a part of the trailer-frame, is of smaller dimensions than the yoke 12 of the hopper-carrying frame in order that said yoke 17 may be disposed in vertical position and within the yoke 12, as shown by Fig. 2. Said smaller yoke 17 is thus adapted to lie compactly within the yoke 12, and the two yokes are connected together by means of a vertical king-bolt 18, the latter passing through the upper and lower portions of the two yokes and serving to connect the trailer-frame to the hopper-frame in a manner which permits said trailer-frame to have a limited swinging movement in a horizontal plane on the axis afforded by said king-bolt.

It will be observed that the front part of the trailer-frame has its yoke connected to the rear end of the hopper-frame by the king-bolt; but the rear part of the trailer-frame is itself supported by the ground-wheel 19, the latter being of any suitable construction and fitted loosely on an axle 20, which is supported in the side bars 15 of the trailer-frame. This ground-wheel has its hub provided with a sprocket-wheel 21, around which passes an endless sprocket-chain 22, which extends in a forward direction to and around a sprocket-wheel 23, the latter being situated within the yoke 17 of the trailer-frame and close to one of the side bars thereof. (See Figs. 1, 3, and 4.) The yoke 17 is provided at one side of the king-bolt 18 with a short upstanding post 24, and a horizontal arbor 25 is arranged to have one end thereof supported by this post 24, while its other end is supported by a vertical member of the yoke 17 on the trailer-frame. Said sprocket-wheel 23 is made fast with a short horizontal tubular shaft 26, the latter being loosely mounted on the arbor 25, so that the shaft 26 and its sprocket-pinion 23 will be mounted in the yoke 17 of the trailer-frame. This shaft 26 is adapted to be driven by the sprocket-and-chain gearing from the rear ground-wheel 19, and said shaft is equipped at its inner end with a bevel-gear 27, the latter adapted to have intermeshing engagement with another bevel-gear 28, which is made fast with a vertical hollow shaft 29, the latter being loosely or idly mounted on the king-bolt 18, which connects the yokes 12 17 of the hopper and trailer frames pivotally together, whereby said vertical shaft 29 is adapted to rotate idly around the king-bolt.

Any suitable means may be employed for keeping the sprocket-chain 22 in a taut condition; but, as shown by Figs. 1 and 4, I employ a tightening-lever 29$^d$, which is disposed at one side of the trailer-frame and is pivoted at 29$^a$ thereto. This tightening-lever is provided with an upwardly and inwardly extending arm 29$^b$, which overhangs the chain 22 and carries a tightening-roller 30, the latter being adapted to ride upon the upper lead of the endless chain 22. The lever 29$^d$ is normally drawn in a downward direction by a spring 31, which is attached to one bar of the trailer-frame 15 and to the lever 29$^d$, and the roller 30 is thus forcibly held upon the endless chain in order to take up the slack therein and keep it in a taut condition.

The yoke 17 of the front end of the trailer-frame is provided with the rearwardly-extending arms 32, which are united together by the brace 33, as shown by Fig. 2, and these arms of the yoke are adapted to carry or support the driver's seat 34, which is attached to a seat-spring 35, the latter being fastened to one of the arms 32, whereby the seat is supported over the ground-wheel 19 in a position convenient for the operator to place his feet upon the rests 16$^a$ of the cross-bar 16 or to actuate a treadle-lever, to be hereinafter described, and which is provided for the purpose of throwing the driving-gear into and out of operation. The vertical hollow shaft 29, which is sleeved on the king-bolt 18, is provided at a point intermediate of its length with an annular groove 36. (See Figs. 2 and 3.) The bifurcated end of a shipper-fork 37 is arranged to loosely engage with the grooved part of this hollow shaft, and this shipper-fork is provided with a collar 38, the latter being fitted slidably on a stem or spindle 39. This stem or spindle has its lower end secured in a horizontal lower member of the yoke 17, forming a part of the trailer-frame, while the upper end of said spindle is supported in place by an inwardly-extending bracket-arm 40, which is secured to the vertical member of said yoke 17. (See Fig. 3.) This spindle 39 and the shipper-fork 37 are mounted in the yoke 17 on the opposite side of the king-bolt 18 and the vertical shaft 29 from the arbor 25 and the hollow shaft 26, and these parts are adapted to turn with the yoke 17 when it swings around the king-bolt 18. The shipper-fork 37 is normally pressed in a downward direction by means of a coiled spring 41, that is fitted on the stem 39, so as to have its upper end engage with the bracket-arm 40 and its lower end bearing against the collar 38 of the shipper-arm. The vertical hollow shaft 29 is normally pressed by means of a spring 29ᶜ in a downward direction, said spring being coiled around the king-bolt 18 and arranged to bear against the upper member of the yoke 17 and the upper end of the shaft 29, thus holding the gear 28 of the hollow shaft 29 in mesh with the gear 27 of the horizontal hollow shaft 26. The shipper-fork 37 is adapted to be moved in an upward direction by means of the treadle-lever 42, the latter being fulcrumed, as at 42ª, to one of the side bars 15 of the trailer-frame and provided with a footpiece 43, the front end of said shipper-lever being pivotally connected, as at 44, to the collar 38 of the shipper-fork. It is evident that the operator can apply pressure to the footpiece 43 in order to turn the lever 42 and move the shipper-fork 37 in an upward direction against the energy of the spring 41, and this shipper-fork serves to lift the hollow shaft 29 against the pressure of its spring 29ᶜ, thereby disengaging the gear 28 of said hollow vertical shaft from the gear 27 and throwing the driving mechanism out of service. If desired, a suitable catch or detent (not shown) may be employed to hold the lever 42 in an inactive position, so as to maintain the shaft 29 in a raised position and keep the gears 27 28 from intermeshing engagement.

The vertical member 13 at the front part of the yoke 12 on the rear end of the hopper frame is adapted to receive a shaft-bearing 45, which may be bolted adjustably to said yoke 12 by the bolts 46. (See Fig. 2.) This shaft-bearing has an opening adapted to register or coincide with the slot 14 in said member 13 of the yoke, and said shaft-bearing supports a counter-shaft 47. This counter-shaft is provided with a gear 48, which meshes with the bevel-gear 28 on the vertical shaft 29, and the front end of said counter-shaft 47 is provided with a crank-disk 49. To this crank-disk is connected the arm 50 of the connecting-lever 51, the latter being arranged in a horizontal position and extending lengthwise of the hopper-supporting frame. This lever 51 is reinforced intermediate of its length by the wear-plates 52, and said lever is arranged to fit in a boxing 53 of a longitudinal plate 54 of the hopper-frame, said plate 54 having one end attached to one side bar 9 and its other end fastened to the cross-bar 10 of said hopper-frame, as shown by Fig. 1. The lever 51 is fulcrumed at a point intermediate of its length by a bolt 55, which passes through the boxing 53, the wear-plates 52, and the lever, said lever being adjustably supported in the boxing 53, because the lever and the wear-plates are provided with a series of openings, as shown by Fig. 6. The rear end of the lever is provided with a clip 51ª, to which is attached one end of the link 50, while the front end of the lever has a slotted plate 51ᵇ, adapted to receive a pin 56, as shown by Fig. 2, said pin being made fast to a reciprocatory actuating-bar 57. (See Figs. 1 and 2.)

The hopper 58 is arranged across the front part of the hopper-frame, and it is provided with the depending brackets 59, which are secured to the side bars 9 of said hopper-frame. (See Figs. 2 and 5.) This hopper is provided with a hinged lid 58ª, and within the hopper is a trough-shaped false bottom 59ª. This false bottom is provided on its under side with the parallel flanges 60, and in the false bottom is a series of openings 61, the latter being arranged in a plane between the parallel flanges 60, as shown by Fig. 2, whereby the seed is adapted to pass from the hopper through the opening 61 and into the chamber or space formed by the parallel flanges 60. The bottom 62 of the hopper is provided with a series of outlet-openings 63, which are disposed out of registration with the openings 61 in the false bottom 59ª. A valve-plate 64 is arranged to extend longitudinally through the hopper and to rest upon the bottom 62 thereof, said valve-plate provided with openings 65, adapted to be brought into registry more or less with the openings 63 of the hopper-bottom, thus making provision for regulating the area of the openings 63 and controlling the quantity of seed which may be dropped. This valve-plate 64 is provided with a slot 66 and is confined on the hopper-bottom by a bolt 67, while the other end of the valve-plate is provided with an exposed operating-handle 68. (See Fig. 5.) The reciprocatory bar 57 is disposed in rear of the hopper and close to the bottom thereof, and this bar is slidably fitted in suitable guides 69, which are provided on the rear part of said hopper. The ends of the reciprocatory bar 57 are provided with the forwardly-extending arms 70, one of which is shown by Figs. 7 and 8. These arms 70 are made fast with the bar 57, and said arms are disposed alongside the end portions of the hopper, the free ends of the arms being provided with eyes or openings 71, which are adapted to receive the end portions of the agitator cable or rope 72. This agitator-cable has its end portions knotted, as at 73, to bear against the arms 70, and the attachment of the cable to the arm 70 is made secure by the employment of the keys 73, the latter being inserted in the opening 71 and engaging with the cable or rope. This cable or rope is thus attached to the reciprocatory bar so as to move lengthwise thereof, and said cable passes loosely through openings in the end walls of the hopper in order that it may play freely between the flanges 60 on the false bottom of said hopper. The cable is thus adapted to agitate the seed which drops through the openings in the false bottom and to distribute the seed so that it will pass through the openings in the valve-plate and the bottom 62 of the hopper, thus making provision for the automatic discharge of seed from the hopper when the driving mechanism is in service.

Having thus described my invention, I claim as new and desire to secure by Letters Patent—

1. In an apparatus of the class described, the combination with a frame carrying a dropping mechanism, a wheeled trailing frame, and a king-bolt, of a hollow shaft slidably and revolubly fitted to said king-bolt, a dropper-driving shaft geared to said hollow shaft, another shaft driven by the wheel of the carrying-frame and geared to the hollow shaft, and means for imparting slidable adjustment to the hollow shaft and moving it out of gear with both the other shafts.

2. The combination with a frame provided with seed-dropping mechanism, of a trailing frame, yokes forming parts of said frames and connected pivotally by a king-bolt, a hollow shaft sleeved on the said king-bolt, a counter-shaft geared to the hollow shaft, means actuated by said counter-shaft for driving the seed-dropping mechanism, a ground-wheel journaled in the trailing frame, and gearing between the ground-wheel and said hollow shaft.

3. The combination of a frame provided with a yoke and carrying a seed-dropping mechanism, a trailing frame also provided with a yoke which is fitted to the yoke of the hopper-frame, a king-bolt connecting the two yokes and permitting the trailing frame to have limited movement relative to the hopper-frame, a hollow shaft sleeved on said king-bolt, a ground-wheel in the trailing frame, gearing between the ground-wheel and said hollow shaft for driving the latter, and means actuated by the hollow shaft for driving the seed-dropping mechanism.

4. The combination with a frame carrying seed-dropping mechanism and a trailing frame, of a bolt pivotally connecting the two frames, a hollow shaft sleeved on said king-bolt and capable of a limited slidable movement thereon, a counter-shaft geared to said hollow shaft and having operative connection with the seed-dropping mechanism, a ground-wheel having a train of gearing connecting the same with the hollow shaft, and means for slidably adjusting the hollow shaft and disconnecting it from the counter-shaft.

5. The combination with a suitable support, of a hollow shaft loosely fitted thereon and capable of rotation and of a slidable movement, a shipper-fork connected to said hollow shaft, a lever engaging with said shipper-fork, a counter-shaft normally geared to the hollow shaft, and seed-dropping mechanism actuated by said counter-shaft.

6. In an apparatus of the class described, the combination of a frame carrying a dropping mechanism and provided at its rear with a coupling-yoke, a trailing frame also provided with a coupling-yoke arranged for its arms to lap the arms of the first-named yoke, a king-bolt passing through said arms of the two yokes and pivotally connecting said frames, a ground-wheel in the trailing frame, a hollow shaft on the king-bolt, means for driving said hollow shaft from the ground-wheel, and means driven by the hollow shaft for actuating the dropping mechanism.

7. The combination of a hopper provided with a perforated bottom, a false bottom within said hopper and having depending flanges, a valve-plate disposed below the flanges of the false bottom and adjustably connected to said perforated bottom, a reciprocatory bar, and an agitator rope or cable attached to said bar and arranged to play between the flanges of the false bottom and over said valve-plate.

8. The combination with a frame carrying a seed-dropping mechanism and provided with a yoke, of a trailing frame also having a yoke which is provided with rearwardly-extending arms, a seat attached to said arms of the yoke on the trailing frame, a king-bolt pivotally connecting the yokes of the two frames, a ground-wheel in the trailing frame, and a driving mechanism actuated by the ground-wheel and connected with the seed-dropping mechanism.

In testimony whereof I have signed my name to this specification in the presence of two subscribing witnesses.

ALDEN CALEB PALMER.

Witnesses:
W. J. AINSWORTH,
ETHEL FALLOWS.